(12) United States Patent
Reed et al.

(10) Patent No.: US 11,887,082 B2
(45) Date of Patent: Jan. 30, 2024

(54) SYSTEM FOR IMPLEMENTING CENTRALIZED RESOURCE DISTRIBUTION FRAMEWORK

(71) Applicant: BANK OF AMERICA CORPORATION, Charlotte, NC (US)

(72) Inventors: Alfred James Reed, Huntersville, NC (US); Katherine Shaw, Concord, NC (US); Kathryn Elizabeth Outlaw, Scarsdale, NY (US); Stephanie Ardman, Ambler, PA (US); Allison June Shonerd, New York, NY (US); Derrick Altair Walton, Montclair, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/544,047

(22) Filed: Dec. 7, 2021

(65) Prior Publication Data

US 2022/0188784 A1    Jun. 16, 2022

Related U.S. Application Data

(60) Provisional application No. 63/125,452, filed on Dec. 15, 2020.

(51) Int. Cl.
*G06Q 20/10* (2012.01)
*G06Q 20/40* (2012.01)

(52) U.S. Cl.
CPC ........ *G06Q 20/108* (2013.01); *G06Q 20/102* (2013.01); *G06Q 20/4014* (2013.01)

(58) Field of Classification Search
CPC . G06Q 20/108; G06Q 20/102; G06Q 20/4014
(Continued)

(56) References Cited

U.S. PATENT DOCUMENTS 6,026,376 A    2/2000 Kenney
6,697,838 B1   2/2004 Jakobson
(Continued)

FOREIGN PATENT DOCUMENTS

| CA | 3101699 A1 * | 6/2022 | ........... G06Q 20/102 |
| EP | 3285219 A1 * | 2/2018 | ............. G06Q 20/20 |
| WO | WO-2018140272 A1 * | 8/2018 | ............. G06Q 20/10 |

OTHER PUBLICATIONS

Zuniga et al.: Optimization of the Storage Location Assignment and Picker-Routing Problem Using Mathematical Programming, Jan. 10, 2020, Applied Sciences, 10, 534; doi: 10.3390/app10020534, pp. 1-15 (Year: 2020).*

(Continued)

*Primary Examiner* — Bijendra K Shrestha
(74) *Attorney, Agent, or Firm* — Moore & Van Allen PLLC; Anup Shrinivasan Iyer

(57) ABSTRACT

Systems, computer program products, and methods are described herein for implementing centralized resource distribution framework. The present invention is configured to electronically receive, from a computing device associated with a client, an indication to initiate a resource transfer to a user; retrieve, from a resource repository, one or more resource transfer parameters associated with the user based on at least the information associated with the user; and execute the resource transfer to the user based on at least the one or more resource transfer parameters, wherein executing further comprises transferring the resource from a source repository to the one or more target repositories via the one or more resource routing channels.

14 Claims, 4 Drawing Sheets

(58) Field of Classification Search
USPC .......................................................... 705/42
See application file for complete search history.

(56) References Cited

U.S. PATENT DOCUMENTS

| | | | |
|---|---|---|---|
| 11,451,622 B1* | 9/2022 | Perez | ...................... H04L 67/62 |
| 2001/0016833 A1 | 8/2001 | Everling et al. | |
| 2001/0027423 A1 | 10/2001 | Clonts et al. | |
| 2002/0004770 A1 | 1/2002 | Phillips et al. | |
| 2002/0026395 A1 | 2/2002 | Peterson | |
| 2002/0091562 A1 | 7/2002 | Siegel et al. | |
| 2002/0128851 A1 | 9/2002 | Chefalas et al. | |
| 2002/0129062 A1 | 9/2002 | Luparello | |
| 2002/0184302 A1 | 12/2002 | Prueitt et al. | |
| 2003/0033272 A1 | 2/2003 | Himmel et al. | |
| 2003/0055733 A1 | 3/2003 | Marshall et al. | |
| 2003/0074253 A1 | 4/2003 | Scheuring et al. | |
| 2003/0084001 A1 | 5/2003 | Chang | |
| 2003/0126094 A1 | 7/2003 | Fisher et al. | |
| 2004/0044588 A1 | 3/2004 | Smith et al. | |
| 2004/0105126 A1 | 6/2004 | Minowa et al. | |
| 2004/0117315 A1 | 6/2004 | Cornuejols | |
| 2004/0162778 A1 | 8/2004 | Kramer et al. | |
| 2004/0210527 A1 | 10/2004 | Woda et al. | |
| 2005/0010505 A1 | 1/2005 | Darrell | |
| 2007/0053518 A1 | 3/2007 | Tompkins et al. | |
| 2011/0145152 A1* | 6/2011 | McCown | ........... G06Q 20/3674 705/67 |
| 2016/0071373 A1* | 3/2016 | Anderson | ............... G07F 9/001 463/25 |
| 2016/0132884 A1* | 5/2016 | Fridman | ............ G06Q 20/4014 705/40 |
| 2020/0234536 A1* | 7/2020 | Azzam | ................ G07F 17/3209 |
| 2022/0180337 A1* | 6/2022 | Dunjic | ............... G06Q 20/3821 |

OTHER PUBLICATIONS

OECD: Strengthening Resource Tracking and Monitoring Health Expediture, Sep. 2014, Republic of Kenya, Ministry of Health, pp. 1-39 (Year: 2014).*

Gliklich et al.: Managing Patient Identity Across Data Sources, Apr. 2014, Agency for Healthcare Research and Quality (US), pp. 1-18 (Year: 2014).*

Comu et al.: Flow Changes Cross Reositories with Rational Team Concert, May 2017, Build Basis Rational Team Concert 3.0, 4.0, 5.0 and 6.0, IBM, pp. 1-12 (Year: 2017).*

* cited by examiner

US 11,887,082 B2

SYSTEM FOR IMPLEMENTING CENTRALIZED RESOURCE DISTRIBUTION FRAMEWORK

PRIORITY CLAIM

This application claims priority to U.S. Provisional Application Ser. No. 63/125,452, entitled "SYSTEM FOR IMPLEMENTING CENTRALIZED RESOURCE DISTRIBUTION FRAMEWORK", filed Dec. 15, 2020, which is incorporated herein by reference in its entirety.

FIELD OF THE INVENTION

The present invention embraces a system for implementing centralized resource distribution framework.

BACKGROUND

There is a need for a centralized resource distribution framework to facilitate resource transfer on behalf of clients.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for implementing centralized resource distribution framework is presented. The system comprising: at least one non-transitory storage device; and at least one processing device coupled to the at least one non-transitory storage device, wherein the at least one processing device is configured to: electronically receive, from a computing device associated with a client, an indication to initiate a resource transfer to a user, wherein the indication comprises information associated with the user and information associated with a resource; retrieve, from a resource repository, one or more resource transfer parameters associated with the user based on at least the information associated with the user, wherein retrieving further comprises: determining one or more resource routing channels associated with the user; and determining one or more target repositories associated with the user; and execute the resource transfer to the user based on at least the one or more resource transfer parameters, wherein executing further comprises transferring the resource from a source repository to the one or more target repositories via the one or more resource routing channels.

In some embodiments, the at least one processing device is further configured to: electronically receive, from a computing device of the user, an indication to register with the resource repository; transmit, via the computing device of the user, an identity verification request to the user in response to receiving the indication to register with the resource repository; electronically receive, from the computing device of the user, one or more identification information associated with the user in response to the identity verification request; initiate an identity verification protocol based on at least receiving the one or more identification information associated with the user; validate, using the identity verification protocol, an identity of the user based on at least the one or more identification information; and transmit, via the computing device of the user, a notification to the user indicating that the user has been registered with the resource repository based on at least validating the identity of the user.

In some embodiments, the at least one processing device is further configured to: electronically receive, from the computing device of the user, the one or more resource transfer parameters, wherein receiving further comprises: receiving information associated with the one or more resource routing channels; and receiving information associated with the one or more target repositories; and store the one or more resource transfer parameters associated with the user in the resource repository.

In some embodiments, the at least one processing device is further configured to: electronically receive, from the computing device associated with the client, the indication to initiate the resource transfer to the user; retrieve, from the resource repository, the one or more resource transfer parameters associated with the user, wherein the one or more resource transfer parameters comprises one or more resource types; retrieve, from the source repository, the resource, wherein the resource is associated with an initial resource type; initiate a resource transformation protocol on the resource to transform the resource from the initial resource type to at least one of the one or more resource types; and transform, using the resource transformation protocol, the resource into the at least one of the one or more resource types.

In some embodiments, the at least one processing device is further configured to: execute the resource transfer to the user based on at least the one or more resource transfer parameters, wherein executing further comprises transferring the transformed resource to the one or more target repositories via the one or more resource routing channels.

In some embodiments, the at least one processing device is further configured to: electronically receive, from the computing device associated with the client, the indication to initiate the resource transfer to the user, wherein the indication comprises a recipient choice routing option; retrieve, from the resource repository, the one or more target repositories associated with the user; and transmit, via the computing device of the user, a notification to the user indicating that the client wishes to initiate the resource transfer using the recipient choice routing option.

In some embodiments, the at least one processing device is further configured to: initiate, on the computing device of the user, a recipient choice routing portal, wherein the recipient choice routing portal comprises the one or more resource routing channels; electronically receive, via the recipient choice routing portal, a user selection of at least one of the one or more resource routing channels in response to receiving the notification; and execute the resource transfer to the user, wherein executing further comprises transferring the resource from the source repository to the one or more target repositories via the at least one of the one or more resource routing channels selected by the user.

In another aspect, a computer program product for implementing centralized resource distribution framework is presented. The computer program product comprising a non-transitory computer-readable medium comprising code causing a first apparatus to: electronically receive, from a computing device associated with a client, an indication to initiate a resource transfer to a user, wherein the indication comprises information associated with the user and information associated with a resource; retrieve, from a resource repository, one or more resource transfer parameters associated with the user based on at least the information associated with the user, wherein retrieving further comprises: determining one or more resource routing channels associated with the user; and determining one or more target repositories associated with the user; and execute the resource transfer to the user based on at least the one or more resource transfer parameters, wherein executing further comprises transferring the resource from a source repository to the one or more target repositories via the one or more resource routing channels.

In yet another aspect, a method for implementing centralized resource distribution framework is presented. The method comprising: electronically receiving, from a computing device associated with a client, an indication to initiate a resource transfer to a user, wherein the indication comprises information associated with the user and information associated with a resource; retrieving, from a resource repository, one or more resource transfer parameters associated with the user based on at least the information associated with the user, wherein retrieving further comprises: determining one or more resource routing channels associated with the user; and determining one or more target repositories associated with the user; and executing the resource transfer to the user based on at least the one or more resource transfer parameters, wherein executing further comprises transferring the resource from a source repository to the one or more target repositories via the one or more resource routing channels.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
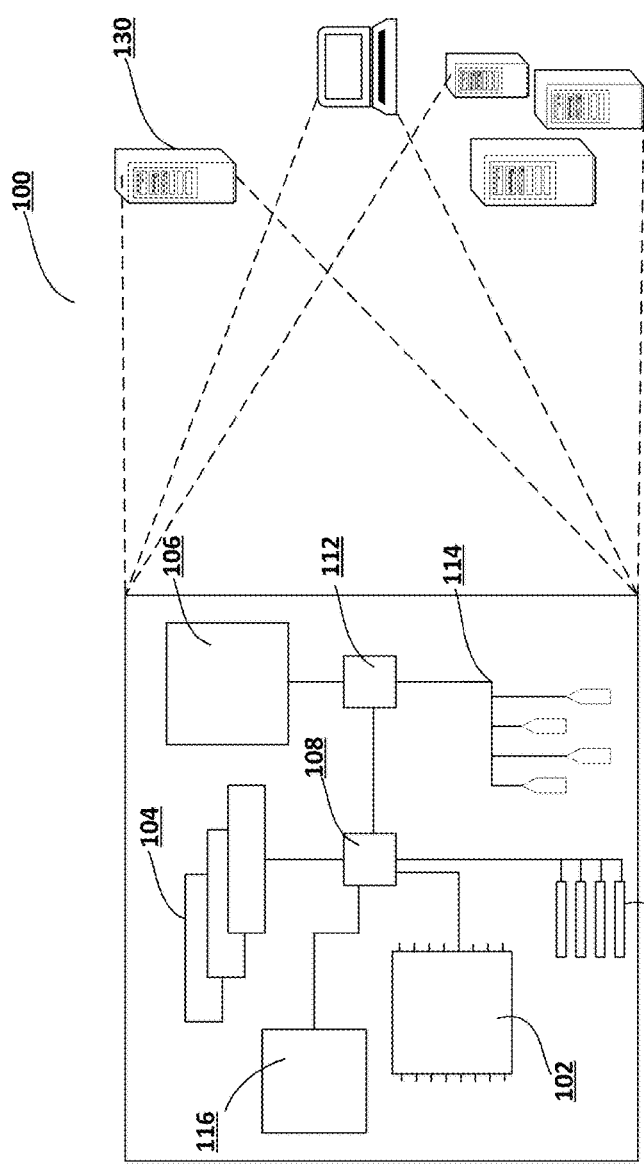
Figure 1:
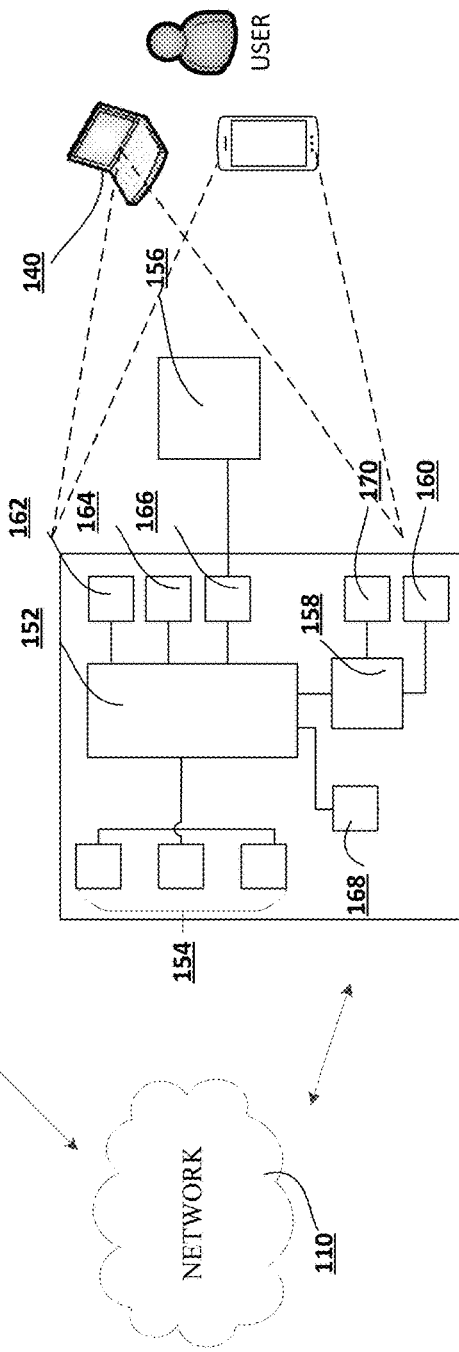
Figure 2:
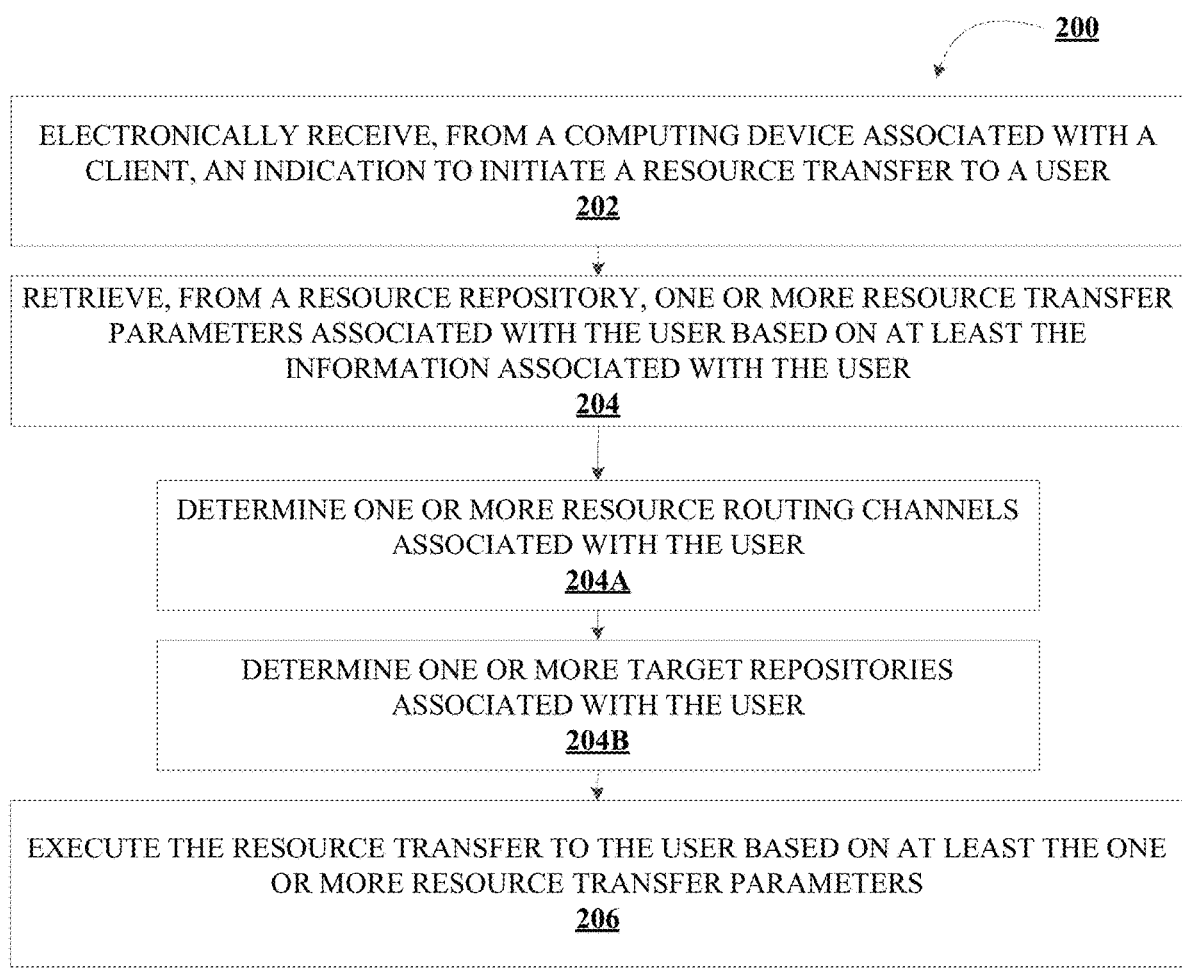
Figure 3:
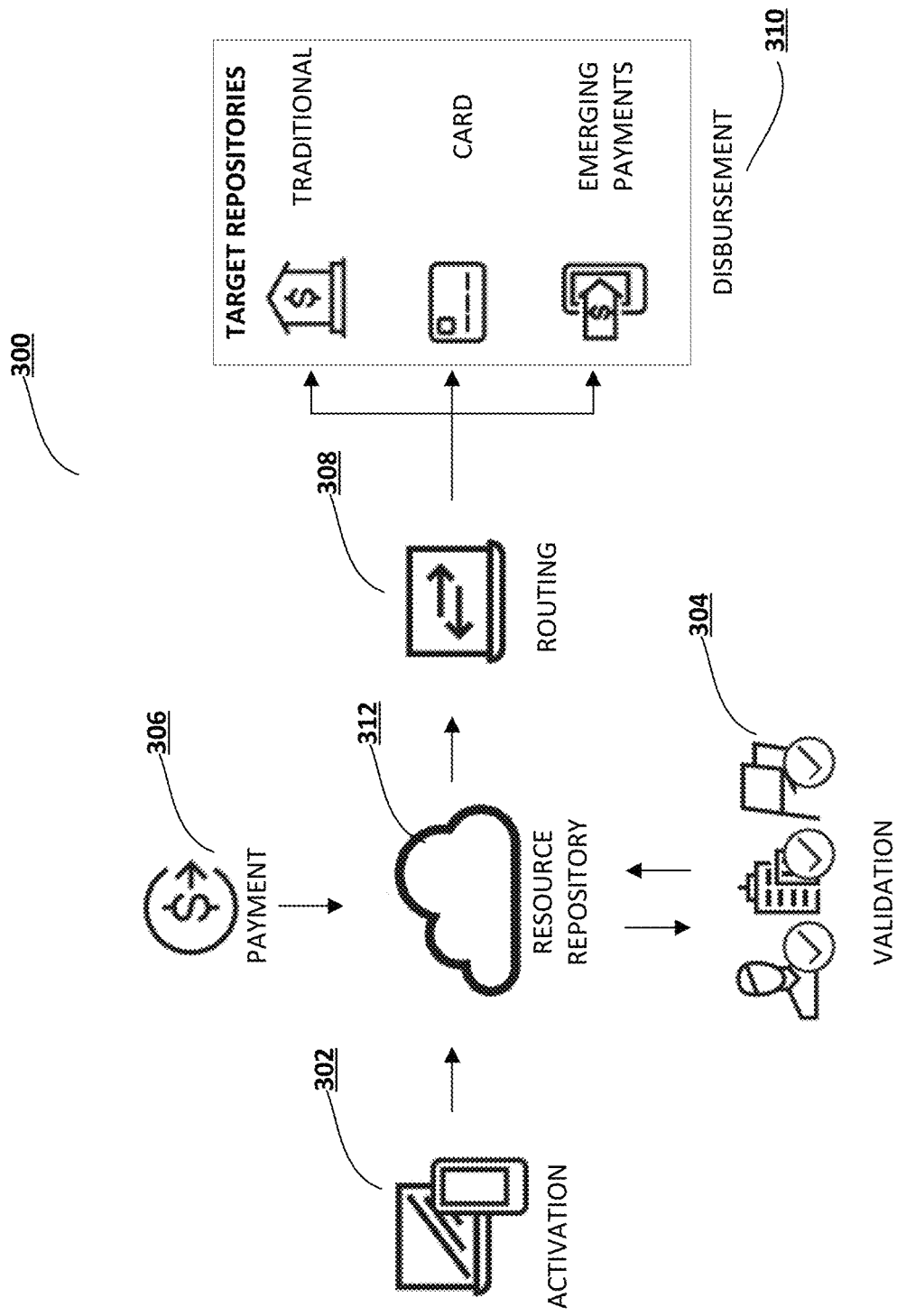
Figure 4:
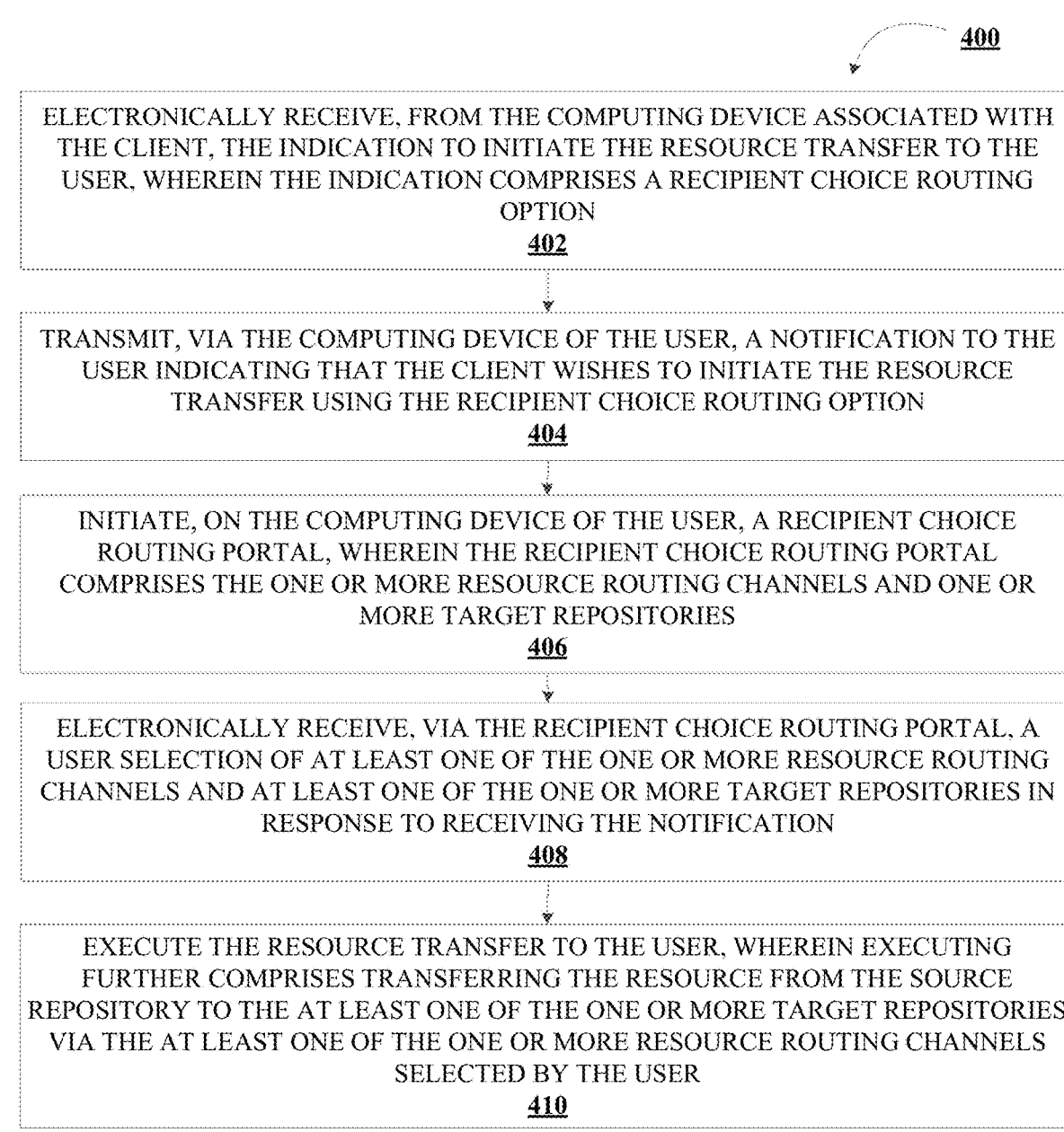

Having thus described embodiments of the invention in general terms, reference will now be made the accompanying drawings, wherein:

FIG. 1 illustrates technical components of a system for implementing centralized resource distribution framework, in accordance with an embodiment of the invention;

FIG. 2 illustrates a process flow for implementing centralized resource distribution framework, in accordance with an embodiment of the invention;

FIG. 3 illustrates a data flow diagram for implementing a centralized payment transfer framework, in accordance with an embodiment of the invention; and FIG. 4 illustrates a process flow for executing the resource transfer based on a recipient choice routing option, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "client" may be an individual or an organization having past relationships, current relationships or potential future relationships with an entity and/or the user. In some embodiments, the client may use the products and/or services provided by the entity to execute resource transfers. In one aspect, the client may use the technology infrastructure and information technology resources of the entity to identify, authenticate, and route resources to one or more users. In some other embodiments, the client may not have a relationship with the entity.

As described herein, a "user" may be an individual associated with an entity and/or a client. As such, in some embodiments, the user may be an individual having past relationships, current relationships or potential future relationships with an entity and/or a client. In some embodiments, a "user" may be any individual, entity or system who has a relationship with the entity and/or the client, such as a customer or a prospective customer. In some other embodiments, the user may not have a relationship with the entity.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "protocol" may refer to core elements of a computer program, or part of a computer program that serves as a foundation for a larger piece of software and drives the functionality of the software. A protocol may be self-contained, but externally-controllable code that encapsulates powerful logic designed to perform or execute a specific type of function. In one aspect, a protocol may be underlying source code that establishes file hierarchy, input and output methods, and how a specific part of a computer program interacts or communicates with other software and/or hardware. The specific components of a protocol may vary based on the needs of the specific computer program as part of the larger piece of software. In some embodiments, a protocol may be configured to retrieve resources created in other computer programs, which may then be ported into the protocol for use during specific operational aspects of the protocol. A protocol may be configurable to be implemented within any general purpose computing system. In doing so, the protocol may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. In the context of an entity such as a financial institution, a resource transfer may refer to one or more of: a sale of goods and/or services, a rewards transfer, an account money transfer or withdrawal, opening a bank application on a user's computer or mobile device, a user accessing their e-wallet, or any other interaction involving the user and/or the user's device that invokes or is detectable by the financial institution. In some embodiments, the user may authorize a resource transfer using at least a payment instrument (credit cards, debit cards, checks, digital wallets, currency, loyalty points), and/or payment credentials (account numbers, payment instrument identifiers). A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer" a "transaction", "transaction event" or "point of transaction event" may refer to any activity between a user, a client, an entity, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a purchase for a product, service, or the like from a merchant. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, a "resource routing channel" may refer to a transmission and/or communication medium that is configured to and capable of facilitating the transfer of resources. In some embodiments, a resource routing channel may refer to the methods used to transfer the resources as well as the specific hardware, software, and/or network components used in the resource transfer process. In examples where a resource transfer is a payment, processing of funds, purchase of goods or services, a return of goods or services, a payment transaction, a credit transaction, or other interactions involving a user's resource or account, a resource routing channel may be various modes of payment transfers such as check clearing, automated clearing house (ACH), card networks, same-day electronic funds transfer systems, mobile payment services, digital wallet technologies, and/or any applicable emerging payment technologies.

FIG. 1 presents an exemplary block diagram of the system environment for implementing centralized resource distribution framework 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices automated teller machine devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices, such as the client computing device (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 140 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for implementing centralized resource distribution framework 200, in accordance with an embodiment of the invention. As shown in block 202, the process flow includes electronically receiving, from a computing device associated with a client, an indication to initiate a resource transfer to a user. As described herein, the client and the user may have a pre-existing relationship. As part of their relationship, the client may have to transfer resources to the user. To initiate the resource transfer to the user, the client may communicate to the system, an indication to initiate the resource transfer. As part of this indication, the client may also include information associated with the user and information associated with a resource. In some embodiments, the information associated with the user may be basic personal user information that is needed for fundamental understanding of the client-user relationship. Examples of such information may include user identification information (e.g., username), email address, contact number, and/or the like. In addition, the client may provide information associated with the resource that is to be transferred to the user. Examples of such information may include an amount of funds to be transferred to the user.

Next, as shown in block 204, the process flow includes retrieving, from a resource repository, one or more resource transfer parameters associated with the user based on at least the information associated with the user. In some embodiments, the resource repository may be configured to hold user data records, make user data records available to use for resource transfer purposes, and organize the user data records in a logical manner. In one aspect, each user data record may include information associated with one or more resource routing channels for the user. In some embodiments, the resource routing channels may refer to various modes of resource transfers as identified by the user and capable of directing a transfer of resources from a source repository (of a client) to a target repository of the user. In some other embodiments, each user data record may include information associated with one or more target repositories of the user. In some embodiments, target repositories may be user-specific records as identified by the user that hold resources, and track resource transfers executed by the user with one or more third parties.

Next, as shown in block 204A, the process flow includes determining one or more resource routing channels associated with the user. In some embodiments, the system may be configured to identify a specific user data record in the resource repository using the information associated with the user, as received from the computing device of the client. In this regard, the system may be configured to compare the information with the user with each user data record stored in the resource repository to determine a match. In response to determining a match, the system may be configured to determine the corresponding resource routing channels associated with the user data. As described herein, in examples where a resource transfer is a payment, processing of funds, purchase of goods or services, a return of goods or services, a payment transaction, a credit transaction, or other similar interactions, a resource routing channel may be various modes of payment transfers such as check clearing, automated clearing house (ACH), card networks, same-day electronic funds transfer systems, mobile payment services, digital wallet technologies, and/or any applicable emerging payment technologies.

Next, as shown in block 204B, the process flow includes determining one or more target repositories associated with the user. Similarly, in response to determining a match, the system may be configured to determine the target repositories associated with the user. In one aspect, each target repository may be associated with a resource routing channel capable of facilitating the transfer of resources from a source repository to a target repository. In one example, if the resource routing channel is a mobile payment service, the associated target repository may be an intermediary repository that is proprietary to the mobile payment service. Any resource transfer executed using the mobile payment service will automatically be stored in the associated target repository. In another example, if the resource routing channel is an automated clearing house, the associated target repository may be a financial institution account that is maintained by the entity that is a participating institution.

In some embodiments, in response to receiving, from the computing device of the client, an indication to initiate the resource transfer to the user, the system may be configured to transmit a notification to the computing device of the user indicating that the client wishes to execute the resource transfer. As part of the notification, the system may be configured to transmit a request to the user to accept the resource transfer. Also, as part of the notification, the system may be configured to transmit the one or more resource routing channels and one or more target repositories as retrieved from the resource repository and request a user selection of a preferred resource routing channel and a preferred target repository to receive the resource. In response, the system may be configured to receive, from the computing device of the user, a user acknowledgement of the resource transfer and a user selection of the preferred resource routing channel and the preferred target repository to receive the resource. In some embodiments, the system may be configured to allow the user to confirm the one or more resource routing channels and the one or more target repositories for informational accuracy before selecting the preferred resource routing channel and the preferred target repository.

In some embodiments, the system may be configured to contact the user to enrich the user data with the information required to execute resource transfers. In this regard, the system may be configured to initiate a communication with the user to begin the onboarding and/or enriching process. In response to the initial communication, the system may be configured to electronically receive, from the computing device of the user, an indication to register with the resource repository. In response, the system may be configured to transmit, via the computing device of the user, an identity verification request to the user in response to receiving the indication to register with the resource repository. In response to the request, the system may be configured to electronically receive, from the computing device of the user, one or more identification information associated with the user.

Once the identification information is received, the system may be configured to initiate an identity verification protocol to ensure that the identity of the user matches what the user claims it to be. In some embodiments, the identity verification protocol may be a multi-layered and exposure-based identity and authentication solution capable of differentiating an authorized user from an unauthorized one. In this regard, the identity verification protocol may implement a number of techniques to vet the user and gain a complete view of their misappropriation and exposure thoroughly with physical and digital identity information. To achieve this, the identity verification protocol may implement a number of verification methodologies including, knowledge-based verification, multi-factor verification, bureau-based knowledge checks, database assessments, online verification that uses artificial intelligence, biometrics, computer vision and human review, and/or similar applicable verification methodologies. Using the identity verification protocol, the system may be configured to validate an identity of the user based on at least the identification information received. In response, the system may be configured to transmit, via the computing device of the user, a notification to the user indicating that the user has been registered with the resource repository.

Once the identity of the user has been validated, the system may be configured to generate a user data record and store the user data record in the resource repository. In some embodiments, the system may be configured to electronically receive, from the computing device of the user, the one or more resource transfer parameters. In this regard, the system may be configured to receive information associated with the one or more resource routing channels and information associated with the one or more target repositories. In response to receiving the resource transfer parameters from the user, the system may be configured to store the resource transfer parameters and associate the resource transfer parameters with the applicable user data record in the resource repository.

Next, as shown in block 206, the process flow includes executing the resource transfer to the user based on at least the one or more resource transfer parameters. In some embodiments, executing the resource transfer may include transferring the resource from a source repository to the one or more target repositories via the one or more resource routing channels. In some embodiments, the source repository may be client-specific records maintained by the entity that hold resources, and track resource transfers executed by the client with one or more third parties (such as a user). Since the client is the owner of the client-user relationship, the client is ultimately responsible for transferring resources to the user. The client merely utilizes the system developed and maintained by the entity to facilitate the transfer of resources. In this regard, the system may be configured to capture, store, and manage data required to facilitate the transfer of resources from a source repository associated with the client to the one or more target repositories of the user.

In some embodiments, the one or more resource transfer parameters associated with the user may include one or more resource types. In some cases, the resource stored in the source repository of the client may have a different resource type as that accepted by the target repository of the user. In some embodiments, a resource type may refer to an alternate form of currency, such as shares, stocks, options, funds, and/or the like. Before executing the resource transfer, the system may be configured to ensure that resource type associated with the resource matches the one or more resource types. Accordingly, in some embodiments, the system may be configured to retrieve, from the source repository, the resource, wherein the resource is associated with an initial resource type. In response, the system may be configured to initiate a resource transformation protocol on the resource to transform the resource from the initial resource type to at least one of the one or more resource types. In response, the system may be configured to transform, using the resource transformation protocol, the resource into the at least one of the one or more resource types. Once transformed, the system may then be configured to transfer the transformed resource to the one or more target repositories via the one or more resource routing channels.

FIG. 3 illustrates a data flow diagram for implementing a centralized payment transfer framework 300, in accordance with an embodiment of the invention. At step 302, the data flow begins with the user (beneficiary) who provides personal and payment information to be stored in the resource repository 312. At step 304, the data flow continues with the validation step, where the system initiates the identity verification protocol to validate and verify the identity of the user. In addition to verifying the identity of the user, the system may also be configured to verify the payment information (resource transfer parameters) and any other funds transfer requirements needed for successful transfer of funds to the user. At step 306, the data flow continues by receiving an indication from the client regarding a payment notice. In one aspect, the payment notice may include basic information associated with the user. Once the information is received, the system may be configured to use the information to identify the matching user data record in the resource repository 312. If there is a match, the system may then be configured to retrieve the associated payment information, including account information, routing information, or the like, to begin the funds transfer process. At step 308, the data flow continues with the routing step where the system may be configured to enrich the funds transfer protocol with the routing information. At step 310, the data flow continues with the disbursement step where the system may be configured to initiate the disbursement process ensure that the user receives the funds via the preferred routing channel at the preferred target repository.

FIG. 4 illustrates a process flow for executing the resource transfer based on a recipient choice routing option 400, in accordance with an embodiment of the invention. As shown in block 402, the process flow includes electronically receiving, from the computing device associated with the client, the indication to initiate the resource transfer to the user, wherein the indication comprises a recipient choice routing option. As described herein, to initiate the resource transfer to the user, the client may communicate to the system, an indication to initiate the resource transfer. As part of this indication, the client may also include information associated with the user and information associated with a resource. In addition to this, the client may indicate that the resource transfer be initiated to the user using the recipient choice routing option. The recipient choice routing option provides the user to indicate which resource routing channel one wishes to route the resources and which target repository one wishes to receive the resources.

Next, as shown in block 404, the process flow includes transmitting, via the computing device of the user, a notification to the user indicating that the client wishes to initiate the resource transfer using the recipient choice routing option.

Next, as shown in block 406, the process flow includes initiating, on the computing device of the user, a recipient choice routing portal, wherein the recipient choice routing portal comprises the one or more resource routing channels and the one or more target repositories.

Next, as shown in block 408, the process flow includes electronically receiving, via the recipient choice routing portal, a user selection of at least one of the one or more resource routing channels and at least one of the one or more target repositories in response to receiving the notification. In some embodiments, in addition to selecting the preferred target repository, the user may be required to provide adequate information associated with the target repositories to execute a successful resource transfer. In some other embodiments, the system may be configured to retrieve information associated with the target repository selected by the user from the resource repository, provided the user has previously registered with the resource repository.

In some embodiments, in response to receiving the user selection of a preferred target repository, the system may be configured to initiate a target repository validation protocol to ensure that the target repository selected by the user is able to receive the resources. In this regard, the system may be configured to electronically receive information associated with the preferred target repository. In some embodiments, the information associated with the preferred target repository may include information associated the owner of the target repository. In response to receiving the information associated with the owner of the target repository, the system may be configured to compare the information with the identity details of the user to determine a match. This is done to ensure that the preferred target repository is indeed owned by the user and is capable of receiving resources.

Next, as shown in block 410, the process flow includes executing the resource transfer to the user, wherein executing further comprises transferring the resource from the source repository to the at least one of the one or more target repositories via the at least one of the one or more resource routing channels selected by the user.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator—and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for implementing centralized resource distribution framework, the system comprising:
at least one non-transitory storage device; and
at least one processing device coupled to the at least one non-transitory storage device, wherein the at least one processing device is configured to:
receive, from a computing device associated with a client, an indication to initiate a resource transfer to a user, wherein the indication comprises information associated with the user and information associated with a resource;
initiate an identity verification protocol to validate the user in response to receiving the indication, wherein the identity verification protocol comprises a multi-layered exposure-based identity and authentication solution;
receive, from a computing device of the user, physical and digital identity information associated with the user in response to initiating the identity verification protocol;
validate, using the identity verification protocol, the physical and digital identity of the user, wherein validating further comprises gaining a complete view of misappropriation and exposure for the user based on the physical and digital identity of the user;

compare the information associated with the user with each user data record stored in a resource repository to determine a match;

determine one or more resource transfer parameters in response to validating the physical and digital identity of the user and determining the match, wherein the resource transfer parameters comprises one or more target repositories and one or more resource routing channels corresponding to the one or more target repositories that are configured to facilitate the resource transfer from a source repository associated with the user to the one or more target repositories;

retrieve, from the source repository, the resource, wherein the resource is associated with an initial resource type;

initiate a resource transformation protocol on the resource to transform the resource from the initial resource type to at least one of the one or more resource types;

transform, using the resource transformation protocol, the resource into the at least one of the one or more resource types; and execute the resource transfer based on at least the one or more resource transfer parameters, wherein executing further comprises transferring the resource from the source repository to the one or more target repositories via the one or more resource routing channels.

2. The system of claim 1, wherein the at least one processing device is further configured to:
electronically receive, from the computing device of the user, the one or more resource transfer parameters, wherein receiving further comprises:
receiving information associated with the one or more resource routing channels; and
receiving information associated with the one or more target repositories; and
store the one or more resource transfer parameters associated with the user in a resource repository.

3. The system of claim 1, wherein the at least one processing device is further configured to:
execute the resource transfer to the user based on at least the one or more resource transfer parameters, wherein executing further comprises transferring the transformed resource to the one or more target repositories via the one or more resource routing channels.

4. The system of claim 3, wherein the at least one processing device is further configured to:
electronically receive, from the computing device associated with the client, the indication to initiate the resource transfer to the user, wherein the indication comprises a recipient choice routing option; and
transmit, via the computing device of the user, a notification to the user indicating that the client wishes to initiate the resource transfer using the recipient choice routing option.

5. The system of claim 4, wherein the at least one processing device is further configured to:
initiate, on the computing device of the user, a recipient choice routing portal, wherein the recipient choice routing portal comprises the one or more resource routing channels and the one or more target repositories;
electronically receive, via the recipient choice routing portal, a user selection of at least one of the one or more resource routing channels and at least one of the one or more target repositories in response to receiving the notification; and
execute the resource transfer to the user, wherein executing further comprises transferring the resource from the source repository to the at least one of the one or more target repositories via the at least one of the one or more resource routing channels selected by the user.

6. A computer program product for implementing centralized resource distribution framework, the computer program product comprising a non-transitory computer-readable medium comprising code causing a computing processor to:
receive, from a computing device associated with a client, an indication to initiate a resource transfer to a user, wherein the indication comprises information associated with the user and information associated with a resource;
initiate an identity verification protocol to validate the user in response to receiving the indication, wherein the identity verification protocol comprises a multi-layered exposure-based identity and authentication solution;
receive, from a computing device of the user, physical and digital identity information associated with the user in response to initiating the identity verification protocol;
validate, using the identity verification protocol, the physical and digital identity of the user, wherein validating further comprises gaining a complete view of misappropriation and exposure for the user based on the physical and digital identity of the user;
compare the information associated with the user with each user data record stored in a resource repository to determine a match;
determine one or more resource transfer parameters in response to validating the physical and digital identity of the user and determining the match, wherein the resource transfer parameters comprises one or more target repositories and one or more resource routing channels corresponding to the one or more target repositories that are configured to facilitate the resource transfer from a source repository associated with the user to the one or more target repositories;
retrieve, from the source repository, the resource, wherein the resource is associated with an initial resource type;
initiate a resource transformation protocol on the resource to transform the resource from the initial resource type to at least one of the one or more resource types;
transform, using the resource transformation protocol, the resource into the at least one of the one or more resource types; and
execute the resource transfer based on at least the one or more resource transfer parameters, wherein executing further comprises transferring the resource from the source repository to the one or more target repositories via the one or more resource routing channels.

7. The computer program product of claim 6, wherein the code causes the computing processor to:
electronically receive, from the computing device of the user, the one or more resource transfer parameters, wherein receiving further comprises:
receiving information associated with the one or more resource routing channels; and
receiving information associated with the one or more target repositories; and
store the one or more resource transfer parameters associated with the user in a resource repository.

8. The computer program product of claim 6, wherein the code causes the computing processor to:
execute the resource transfer to the user based on at least the one or more resource transfer parameters, wherein executing further comprises transferring the transformed resource to the one or more target repositories via the one or more resource routing channels.

9. The computer program product of claim 8, wherein the code causes the computing processor to:
   electronically receive, from the computing device associated with the client, the indication to initiate the resource transfer to the user, wherein the indication comprises a recipient choice routing option; and
   transmit, via the computing device of the user, a notification to the user indicating that the client wishes to initiate the resource transfer using the recipient choice routing option.

10. The computer program product of claim 9, wherein the code causes the computing processor to:
    initiate, on the computing device of the user, a recipient choice routing portal, wherein the recipient choice routing portal comprises the one or more resource routing channels and the one or more target repositories;
    electronically receive, via the recipient choice routing portal, a user selection of at least one of the one or more resource routing channels and at least one of the one or more target repositories in response to receiving the notification; and
    execute the resource transfer to the user, wherein executing further comprises transferring the resource from the source repository to the at least one of the one or more target repositories via the at least one of the one or more resource routing channels selected by the user.

11. A method for implementing centralized resource distribution framework, the method comprising:
    receiving, using one or more processors, from a computing device associated with a client, an indication to initiate a resource transfer to a user, wherein the indication comprises information associated with the user and information associated with a resource;
    initiating, using the one or more processors, an identity verification protocol to validate the user in response to receiving the indication, wherein the identity verification protocol comprises a multi-layered exposure-based identity and authentication solution;
    receiving, using the one or more processors, from a computing device of the user, physical and digital identity information associated with the user in response to initiating the identity verification protocol;
    validating, using the one or more processors, the physical and digital identity of the user using the identity verification protocol, wherein validating further comprises gaining a complete view of misappropriation and exposure for the user based on the physical and digital identity of the user;
    comparing, using the one or more processors, the information associated with the user with each user data record stored in a resource repository to determine a match;
    determining, using the one or more processors, one or more resource transfer parameters in response to validating the physical and digital identity of the user and determining the match, wherein the resource transfer parameters comprises one or more target repositories and one or more resource routing channels corresponding to the one or more target repositories that are configured to facilitate the resource transfer from a source repository associated with the user to the one or more target repositories;
    retrieving, using the one or more processors, from the source repository, the resource, wherein the resource is associated with an initial resource type;
    initiating, using the one or more processors, a resource transformation protocol on the resource to transform the resource from the initial resource type to at least one of the one or more resource types;
    transforming, using the one or more processors, the resource into the at least one of the one or more resource types using the resource transformation protocol; and
    executing, using the one or more processors, the resource transfer based on at least the one or more resource transfer parameters, wherein executing further comprises transferring the resource from the source repository to the one or more target repositories via the one or more resource routing channels.

12. The method of claim 11, wherein the method further comprises:
    electronically receiving, from the computing device of the user, the one or more resource transfer parameters, wherein receiving further comprises:
        receiving information associated with the one or more resource routing channels; and
        receiving information associated with the one or more target repositories; and
    storing the one or more resource transfer parameters associated with the user in a resource repository.

13. The method of claim 11, wherein the method further comprises:
    executing the resource transfer to the user based on at least the one or more resource transfer parameters, wherein executing further comprises transferring the transformed resource to the one or more target repositories via the one or more resource routing channels.

14. The method of claim 13, wherein the method further comprises:
    electronically receiving, from the computing device associated with the client, the indication to initiate the resource transfer to the user, wherein the indication comprises a recipient choice routing option; and
    transmitting, via the computing device of the user, a notification to the user indicating that the client wishes to initiate the resource transfer using the recipient choice routing option.

* * * * *